United States Patent
Shin et al.

(10) Patent No.: US 11,641,994 B2
(45) Date of Patent: May 9, 2023

(54) MISTAKENLY INGESTED OBJECT IDENTIFYING ROBOT CLEANER AND CONTROLLING METHOD THEREOF

(71) Applicant: SAMSUNG ELECTRONICS CO., LTD., Suwon-si (KR)

(72) Inventors: Jaewook Shin, Suwon-si (KR); Hyunsoo Choi, Suwon-si (KR); Sungjin Kim, Suwon-si (KR); Aeran Lim, Suwon-si (KR); Junho Rim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 17/093,010

(22) Filed: Nov. 9, 2020

(65) Prior Publication Data

US 2021/0142061 A1 May 13, 2021

(30) Foreign Application Priority Data

Nov. 12, 2019 (KR) .......................... 10-2019-0144515

(51) Int. Cl.
*G06K 9/00* (2022.01)
*G06K 9/20* (2006.01)
(Continued)

(52) U.S. Cl.
CPC ............. *A47L 9/2815* (2013.01); *A47L 9/009* (2013.01); *A47L 9/2826* (2013.01);
(Continued)

(58) Field of Classification Search
CPC ...... A47L 9/009; A47L 9/2815; A47L 9/2826; A47L 9/2852; A47L 2201/04;
(Continued)

(56) References Cited

U.S. PATENT DOCUMENTS 8,442,321 B1 * 5/2013 Chang .................. G06V 10/764
382/199
9,697,439 B2 * 7/2017 Gaidon ................ G06V 10/758
(Continued)

FOREIGN PATENT DOCUMENTS

| JP | 2018-143879 A | 9/2018 | |
| JP | 2018143879 A * | 9/2018 | ........... A47L 9/2815 |

(Continued)

OTHER PUBLICATIONS

International Search Report (PCT/ISA/210) dated Feb. 3, 2021 by the International Searching Authority in International Patent Application No. PCT/KR2020/015231.
(Continued)

*Primary Examiner* — Marc Carlson
(74) *Attorney, Agent, or Firm* — Sughrue Mion, PLLC

(57) ABSTRACT

A robot cleaner includes an intake port, a shock detection sensor, a camera, a memory, and a processor. The memory may include an artificial intelligence model trained to identify an object, and the processor may, based on the object being ingested by the intake port, identify an image obtained within a preset time before the object is ingested, among a plurality of images obtained through the camera and identify the object according to the artificial intelligence model. Thereby, a user may be informed that the robot cleaner has ingested the object.

15 Claims, 17 Drawing Sheets

(51) Int. Cl.
| | |
|---|---|
| *G06K 9/62* | (2022.01) |
| *G06K 1/00* | (2006.01) |
| *A47L 9/28* | (2006.01) |
| *A47L 9/00* | (2006.01) |
| *G06T 1/00* | (2006.01) |
| *G06V 20/20* | (2022.01) |
| *G06F 18/25* | (2023.01) |
| *G06F 18/214* | (2023.01) |
| *G06V 10/25* | (2022.01) |

(52) U.S. Cl.
CPC .......... *A47L 9/2852* (2013.01); *G06F 18/214* (2023.01); *G06F 18/25* (2023.01); *G06T 1/0014* (2013.01); *G06V 10/25* (2022.01); *G06V 20/20* (2022.01); *A47L 2201/04* (2013.01)

(58) Field of Classification Search
CPC . A47L 2201/00; A47L 9/2889; G06K 9/6256; G06K 9/6288; G06T 1/0014; G06V 10/22; G06V 10/25
See application file for complete search history.

(56) References Cited

U.S. PATENT DOCUMENTS

| | | | |
|---|---|---|---|
| 9,962,054 | B2 | 5/2018 | Seo et al. |
| 10,111,566 | B2 | 10/2018 | Ahn et al. |
| 10,852,729 | B2 | 12/2020 | Choi et al. |
| 2016/0135655 | A1* | 5/2016 | Ahn ..................... G05D 1/0044 15/319 |
| 2016/0278599 | A1* | 9/2016 | Seo ......................... G08C 17/02 |
| 2018/0154513 | A1* | 6/2018 | Kou ......................... G10L 15/22 |
| 2018/0210445 | A1* | 7/2018 | Choi ..................... G05D 1/0238 |
| 2018/0348783 | A1* | 12/2018 | Pitzer ..................... G05D 1/024 |
| 2019/0176330 | A1* | 6/2019 | Noh ....................... G06V 20/10 |
| 2020/0004260 | A1* | 1/2020 | Kim ....................... G05D 1/0246 |
| 2020/0012292 | A1* | 1/2020 | Park ..................... A47L 11/4011 |
| 2020/0375427 | A1* | 12/2020 | Huang ................. G05D 1/0246 |
| 2021/0142061 | A1* | 5/2021 | Shin ....................... A47L 9/2889 |

FOREIGN PATENT DOCUMENTS

| | | | |
|---|---|---|---|
| JP | 6435019 B2 | | 12/2018 |
| KR | 10-1322510 B1 | | 10/2013 |
| KR | 10-2016-0017933 A | | 2/2016 |
| KR | 20160017933 A | * | 2/2016 |
| KR | 10-2016-0058594 A | | 5/2016 |
| KR | 10-2016-0113857 A | | 10/2016 |
| KR | 10-2018-0087798 A | | 8/2018 |
| KR | 10-2019-0033974 A | | 4/2019 |
| KR | 10-2019-0106874 A | | 9/2019 |
| KR | 10-2017148 B1 | | 9/2019 |

OTHER PUBLICATIONS

Written Opinion (PCT/ISA/237) dated Feb. 3, 2021 by the International Searching Authority in International Patent Application No. PCT/KR2020/015231.

* cited by examiner

MISTAKENLY INGESTED OBJECT IDENTIFYING ROBOT CLEANER AND CONTROLLING METHOD THEREOF

CROSS-REFERENCE TO RELATED APPLICATION

This application is based on and claims priority under 35 U.S.C. § 119 to Korean Patent Application No. 10-2019-0144515, filed on Nov. 12, 2019, in the Korean Intellectual Property Office, the disclosure of which is incorporated by reference herein in its entirety.

BACKGROUND

1. Field

The disclosure relates to a robot cleaner and, more particularly, to a robot cleaner for identifying an object in a surrounding environment through an image obtained using a camera and performing traveling and suction based on the identified object.

2. Description of Related Art

A robot cleaner may detect and identify a nearby object or structure through an object identification module including various sensors and cameras, and may perform traveling and maintenance on a floor according to a detection and identification result of the object identification module.

The robot cleaner identifying an object by analyzing an image obtained in real time through the camera during operation has a restriction in the amount of calculation, there is a limit in the accuracy of detecting and identifying an object while the robot cleaner is in operation.

As a representative example, FIG. 1 is a diagram illustrating a situation of a robot cleaner which mistakenly ingests an object on the floor as a result of failing to correctly identify the object as an object to be avoided.

Referring to FIG. 1, a robot cleaner 10 may analyze an image obtained in real time through a camera to identify an object in real time, and may identify that there is no object. In this example, the robot cleaner 10 may intake a foreign object under an assumption that no object exists on the floor in the path of the robot cleaner.

For example, an object (e.g., earing, ring, or the like) having a small size that should be avoided by the robot cleaner 10, but which is not identified by the robot cleaner may occur. As a result, valuable objects or dangerous objects (nails, glue, etc.) that might damage an internal structure of the robot cleaner 10 may be inadvertently picked up by the robot cleaner 10.

SUMMARY

According to an embodiment, a robot cleaner includes an intake port configured to ingest an object from a floor of a surrounding environment on which the robot cleaner operates, a shock detection sensor configured to detect impact of the object on the robot cleaner, a camera configured to capture a plurality of images of the surrounding environment while the robot cleaner operates, a memory storing computer-readable instructions and a processor configured to control the robot cleaner to based on the impact detected through the shock detection sensor, identify an image of the object captured within a preset time before the impact is detected from among the plurality of images, determine an identity of the object included in the image, and output information indicating that the object has been ingested by the robot cleaner, based on the identity of the object.

According to an embodiment, a method of controlling a robot cleaner includes detecting an impact on the robot cleaner of an object ingested by the robot cleaner from a floor of a surrounding environment on which the robot cleaner operates, capturing a plurality of images of the surrounding environment while the robot cleaner operates, based on the impact, identifying an image of the object captured within a preset time before the impact is detected from among the plurality of images, determining an identity of the object included in the image, and outputting information indicating that the object has been ingested by the robot cleaner, based on the identity of the object.

A system includes a robot cleaner configured to identify an object by providing a plurality of images obtained through a camera as input to a first artificial intelligence model, and to perform traveling and cleaning of a surrounding environment on which the robot cleaner operates based on the object and a server device configured to store a second artificial intelligence model, and the robot cleaner may, based on an impact of the object on the robot cleaner, transmit, to the server device, an image of the object captured within a preset time before a time when the impact is detected from among the plurality of images, and the server device may obtain a plurality of regions corresponding to each patch from the image using a plurality of patches of different sizes, identify the object included in the image by providing the plurality of regions as input to the second artificial intelligence model, and transmit information on an identity of the object to the robot cleaner.

BRIEF DESCRIPTION OF THE DRAWINGS

The above and/or other aspects, features, and advantages of certain embodiments of the disclosure will be more apparent from the following detailed description, taken in conjunction with the accompanying drawings, in which.

DETAILED DESCRIPTION

Figure 1:
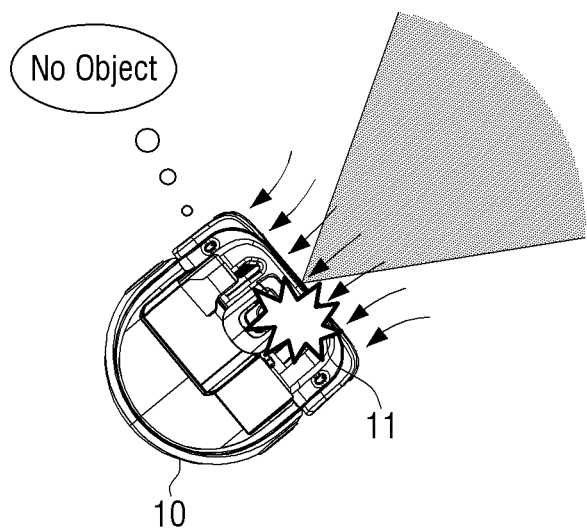
FIG. 1 is a diagram illustrating a conventional situation of a robot cleaner which mistakenly ingests an object as a result of failing to identify an object.

When an object is mistakenly ingested, for example due to a limited calculation resources for performing real-time object identification, a robot cleaner identifies the ingested object and provides a user with an identification result. Accordingly, the user may determine whether it is necessary to retrieve the object from the robot cleaner.

In a rest mode in which there is no temporal limitation after a cleaning mode is completed, a robot cleaner may identify an ingested object by performing an in-depth analysis on an image. Accordingly, even though real-time object identification may be unable to be performed during operation of the robot cleaner, an ingested object may be identified, and the user may determine whether it is necessary to retrieve the object from the robot cleaner.

Before describing the disclosure in detail, an overview for understanding the disclosure and drawings will be provided.

The terms used in the disclosure and the claims are terms identified in consideration of the functions of the various example embodiments of the disclosure. However, these terms may vary depending on intention, legal or technical interpretation, emergence of new technologies, and the like as understood by those skilled in the related art. Also, some terms may be arbitrary selected. The terms may be interpreted as a meaning defined in the disclosure and unless there is a specific definition of a term, the term may be understood based on the overall contents and technological common sense of those skilled in the related art.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

The terms such as "first," "second," and so on may be used to describe a variety of elements, but the elements should not be limited by these terms. The terms are used for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on may refer, for example, to an element that performs at least one function or operation, and such element may be implemented as hardware or software, or a combination of hardware and software. Further, except for when each of a plurality of "modules," "units," "parts," and the like must be realized in an individual hardware, the components may be integrated in at least one module or chip and be realized in at least one processor executing software.

When any part is connected to another part, this includes a direct connection and an indirect connection through another medium. Further, when a certain part includes a certain element, unless specified to the contrary, another element may be additionally included, rather than precluding another element.

Figure 2A:
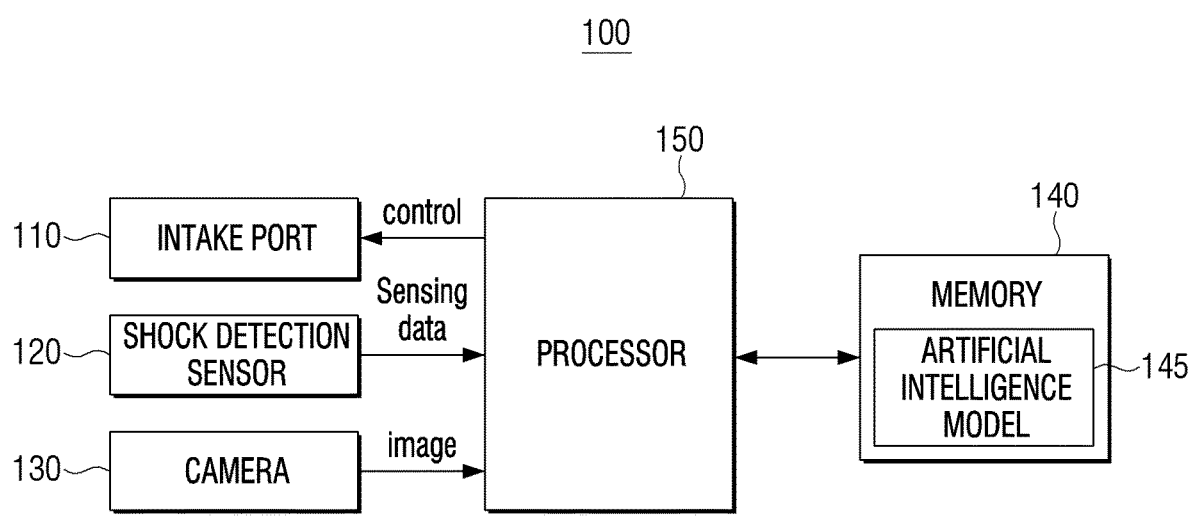
FIG. 2A is a block diagram illustrating a configuration of a robot cleaner according to an embodiment.

FIG. 2A is a block diagram illustrating a configuration of a robot cleaner according to an embodiment.

Referring to FIG. 2A, a robot cleaner 100 may include a intake port 110, a shock detection sensor 120, a camera 130, a memory 140, and a processor 150.

According to an embodiment, the processor 150 may detect a shock based on an object ingested by the intake port 110 through the shock detection sensor 120. The shock may refer to a shock that may occur as the object being ingested by the intake port 110 collides with an external portion or component or an internal portion or component the robot cleaner 100.

When a shock is sensed, the processor 150 may identify an image obtained within a preset time before the time when the shock is detected among a plurality of images obtained through the camera 130.

The plurality of images may be images obtained in real-time by the camera 130 in a state where the operation mode of the robot cleaner 100 is in a cleaning mode. The processor 150 may identify the object by providing one or more of the plurality of images obtained in real-time as input to an artificial intelligence (AI) model 145, which may be stored in the memory 140 or which may be stored in an external server or other device in communication with the robot cleaner 100.

Optimally, in the case that real-time image processing is supported by the robot cleaner 100, the processor 150 may control the intake operation of the intake port 110 based on information on the identified object.

For example, if a watch, or the like, is identified from an image obtained by the camera 130, the processor 150 may change a traveling path of the robot cleaner 100 and/or stop the intake operation of the intake port 110 so that the object is not ingested through the intake port 110. However, to implement such an operation in which the object is prevented from being ingested, the robot cleaner 100 must be configured to have capability of performing the real-time image processing capability.

However, if the object is not identified from the image obtained by the camera 130, whether due to processing error or incapability of the robot cleaner 100 to perform the real-time image processing, the object may be ingested through the intake port 110.

In this example, the shock due to intake may be detected by the shock detection sensor 120, and the processor 150 may identify the obtained image using the plurality of images captured by the camera 130 within a preset time prior to the time when the shock is detected.

The processor 150 may obtain a plurality of regions corresponding to each patch in the identified image among the images captured by the camera 130 by using a plurality of patches of different sizes, and input the plurality of regions to an AI model 145 to identify the object included in the identified image. The patch may denote a window, or the like, for sequentially extracting at least some regions of the image. The regions extracted through the patch may be sequentially input to the AI model 145.

When the identified object is a preset object (e.g., jewelry such as earing, ring, or the like), the processor 150 may provide information on the identified object to a user.

The intake port 110 is configured to obtain foreign substances from a floor by using mechanical means, such as sweeping or brushing, or by vacuum according a pressure difference of air. The intake port 110 may include an inlet, a filter, a brush, a motor, a discharge port, or the like. The intake port 110 may be connected to a type of storage facility in a centrifugal system for depositing dust, dirt, and other objects picked up by the robot cleaner 100 into the storage facility, such as a bag, bin, or other receptacle, but the configuration of the robot cleaner 100 is not limited thereto.

The shock detection sensor 120 is a sensor for detection of a shock between an object ingested by the intake port 110 and one or more components or structures of the robot cleaner 100, such as the intake port 110 of the robot cleaner 100. For example, the shock may be detected when the robot cleaner 100 travels over one or wheels that are propelled by a motor of the robot cleaner. Of course, any vibration or shock detected by the shock detection sensor 120 of the robot cleaner 100 may be analyzed to determine whether the shock is caused by or associated with collision of the object and the robot cleaner 100 by analysis of whether the object is present within the images captured by the camera 130 at a time around which the shock is detected. The shock detection sensor 120 may be implemented as a vibration sensor, a piezoelectric sensor, an acceleration sensor, an inertial sensor, a load cell sensor, or the like, but is not limited thereto. The shock detection sensor 120 may be attached to an inlet, a vicinity of the inlet, a filter, a vicinity of the filter of the intake port 110, the storage facility, a transport path between the intake port 110 and the storage facility, or the like, to detect the shock of the object being ingested by the robot cleaner 100.

The camera 130 is configured to obtain one or more images associated with the surrounding environment of the robot cleaner 100. The camera 130 may be implemented with a red-green-blue (RGB) camera, a three-dimensional (3D) camera, or the like. The camera 130 may be configured to capture images only within an immediate vicinity of the robot cleaner 100 or only within an immediate travel path of the robot cleaner based on the direction in which the robot cleaner travels. In the case that the robot cleaner 100 may be transversely propelled in various directions, the camera 130 may include a plurality of cameras for respectively capturing images in the various directions. Alternatively, a single camera 130 may capture images in all directions from the robot cleaner regardless of the direction of orientation or travel of the robot cleaner 100.

The memory 140 may store various information related to a function of the robot cleaner 100. The memory 140 may include a read-only memory (ROM), a random access memory (RAM), a hard disk, a solid state drive (SSD), a flash memory, or the like.

The memory 140 may store the AI model 145 trained to identify an object. When an image is input to the AI model 145, the AI model 145 may determine information (name, type, product name, etc.) for the object from the input image.

When an image is input to the AI model 145, the AI model 145 may act as a classifier to selectively output information corresponding to the object included in the image from among various possible types of objects.

The processor 150 may be connected to the shock detection sensor 120, the camera 130, and the memory 140, and may be configured to control overall operations of the robot cleaner 100.

Figure 2B:
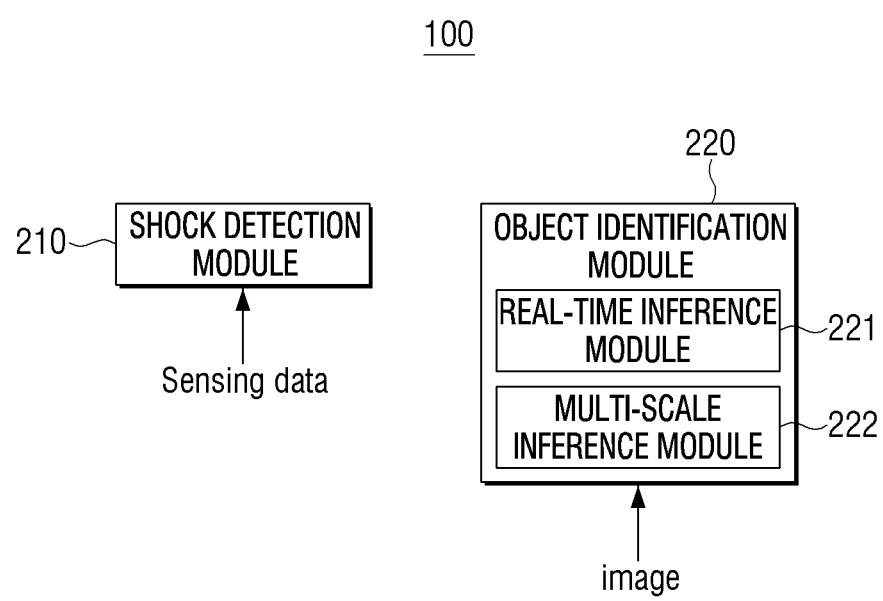
FIG. 2B is a block diagram illustrating a functional configuration of a robot cleaner according to an embodiment.

FIG. 2B is a block diagram illustrating a functional configuration of a robot cleaner according to an embodiment. Referring to FIG. 2B, the robot cleaner 100 may include a shock detection module 210 and an object identification module 220. The object identification module 220 may include a real-time inference module 221 and a multi-scale inference module 222. The modules may be stored in the memory 140 in a software form, executed by the processor 150, and configured to receive control of the processor 150 in a hardware form including a circuitry. The modules may also be implemented in a combined form of software and hardware and may be executed and controlled by the processor 150.

Hereinbelow, an operation of control by the processor 150 according to various embodiments will be described in greater detail along with the configurations of FIG. 2B.

The processor 150 may detect a shock which occurs upon in operation of the intake port 110 through the shock detection module 210.

For example, if the intake port 110 ingests a relatively heavy or rigid object, sensing data corresponding to a shock greater than or equal to a threshold may be received through the shock detection sensor 120, in which case the processor 150 may identify that the shock as being detected.

The processor 150 may identify, through the object identification module 220, an object included in an image obtained through the camera 130. The object identification module 220 may input an image into the AI model 145.

The object identification module 220 may include a real-time inference module 221 and a multi-scale inference module 222.

The real-time inference module 221 may, when an operation mode of the robot cleaner 100 is a cleaning mode, obtain an object by inputting a plurality of images obtained in real time through the camera 130 into the AI model 145.

The real-time inference module 221 may detect and identify an object, by additionally using sensing data received through a light detection and ranging (LiDAR) sensor, an ultrasonic sensor, or the like, in addition to the camera 130.

The processor 150 may control the intake operation of the intake port 110 and the traveling speed and direction of the robot cleaner 100 using the object identification result of the real-time inference module 221. The traveling of the robot cleaner 100 will be described with reference to FIG. 8.

The processor 150 may identify at least one image obtained through the camera 130, among a plurality of images obtained through the camera 130, within a predetermined time prior to the time when the shock is detected. The plurality of images may be images of which object has already been identified by the real-time inference module 221.

Figure 3:
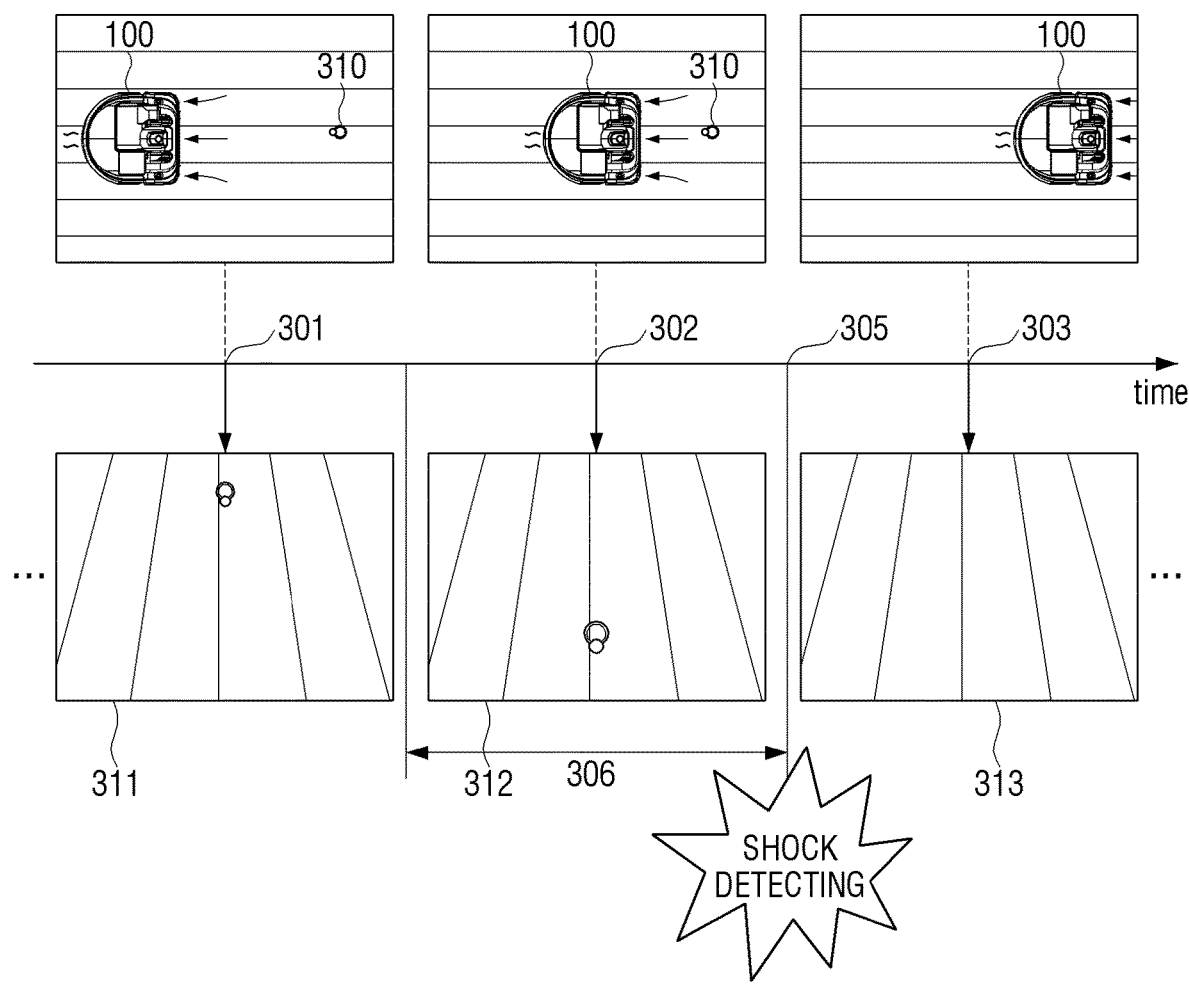
FIG. 3 is a diagram illustrating an example of identifying an image obtained before the time when shock is detected while the robot cleaner is in operation.

FIG. 3 is a diagram illustrating an example of identifying an image obtained before the time when shock is detected while the robot cleaner is in operation.

FIG. 3 illustrates that, while the robot cleaner 100 is approaching an earring 310, the real-time inference module 221 performs object identification for images 311, 312 obtained through the camera 130 at each point in time 301, 302, but fails to identify the earring 310.

Referring to FIG. 3, as the real-time inference module 221 may not identify the earring 310, the earring 310 is ingested into the robot cleaner 100, a shock is detected by the shock detection sensor 120 at a specific point in time 305.

When shock is detected, the processor 150 may identify an image 312 obtained within a preset time 306 prior to the point in time 305 when the shock is detected. The processor 150 may store the identified image 312 in the memory 140.

Referring to FIG. 3, only one image 312 is identified, but a plurality of images may be identified according to a size of a preset time window before the shock.

The processor 150 may identify an image within a preset number of frames from the point in time when the shock is detected. For example, referring to FIG. 3, the processor 150 may identify the images 311, 312 corresponding to the previous two frames that are closest to the point in time 305 when the shock is detected and store the same in the memory 140.

The processor 150, using the multi-scale inference module 222, may identify an object in the selected image. The multi-scale inference module 222 may perform object identification based on the multi-scale patch for the identified image.

The processor 150 may store the image in the memory 140 once the robot cleaner 100 is in the cleaning mode, and then may operate the multi-scale inference module 222 when the robot cleaner 100 is in a rest mode to identify an object included in the stored (identified) image.

As a result, the object identification of the real-time inference module 221 may continue without a problem on the cleaning mode, without burdening a limited amount of computation of the robot cleaner 100. Since the multi-scale patch-based object identification to be performed by the multi-scale inference module 222 has greater computation when performing object identification on the same number of images than the real-time inference module 221 and thus, may perform object identification through the multi-scale inference module 222 without restriction of time on the rest mode.

The multi-scale inference module 222 may obtain a plurality of regions corresponding to each patch in an image using a plurality of patches of different sizes, and input the obtained plurality of regions to the AI model 145 to identify the object included in the identified image.

Figure 4:
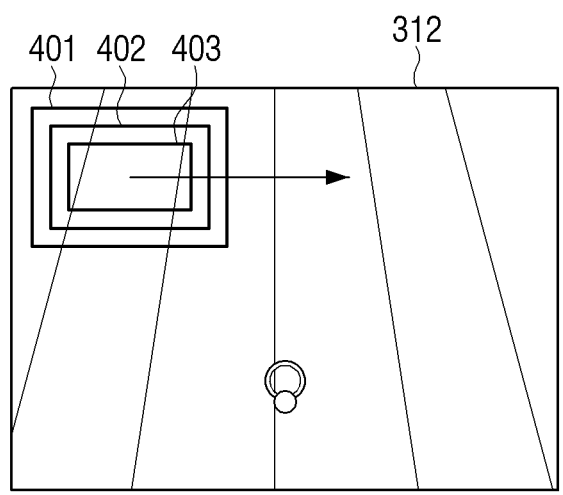
FIG. 4 is a diagram illustrating an example of extracting a plurality of regions in an image identified using a multi-scale patch by the robot cleaner.

FIG. 4 is a diagram illustrating an example of extracting a plurality of regions in an image identified using a multi-scale patch by the robot cleaner.

Referring to FIG. 4, the processor 150 may extract various regions included in the image 312 through each of the different sized patches 401, 402, 403, and input the extracted regions into the AI model 145.

The processor 150 may provide as input each of the plurality of regions corresponding to each patch to the AI model 145 to obtain output for each of the plurality of regions from the AI model 145.

The processor 150 may identify an object included in the identified image based on the output obtained from the AI model and location of each of the plurality of regions in the identified image.

Figure 5A:
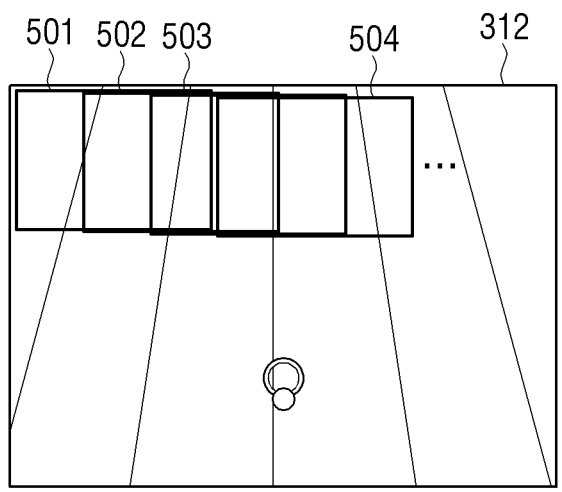
FIG. 5A and FIG. 5B are diagrams illustrating an example of obtaining a plurality of regions in an image using a multi-scale patch by a robot cleaner and inputting each of a plurality of regions into an artificial intelligence model.
Figure 5A:
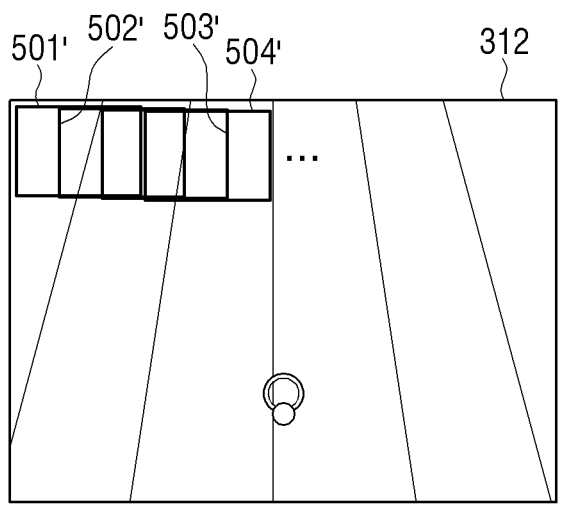
Figure 5A:
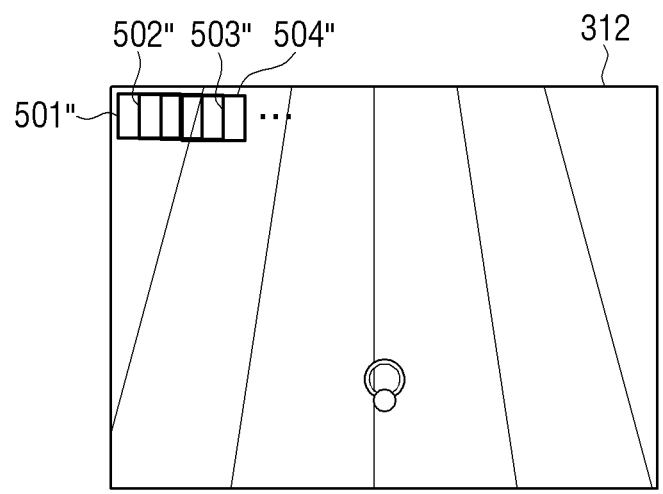
Figure 5B:
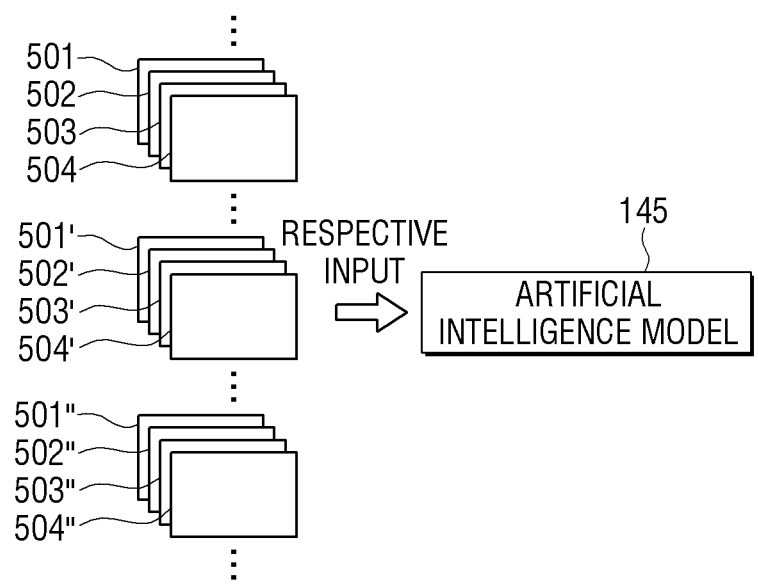

FIG. 5A and FIG. 5B are diagrams illustrating an example of obtaining a plurality of regions in an image using a multi-scale patch by a robot cleaner and inputting each of a plurality of regions into an artificial intelligence model.

Referring to FIG. 5A, the processor 150 may extract a plurality of regions 501, 502, 503, 504 from the image 312 using a first patch with a first size. The processor 150 may extract a plurality of regions 501', 502', 503', 504' using a second patch with a second size that is less than the first size. The processor 150 may extract a plurality of regions 501", 502", 503", 504" . . . from the image 312 using a third patch with a size less than the second size.

Referring to FIG. 5B, the processor 150 may input a plurality of regions obtained thereby to the AI model 145 and obtain output of the AI model 145, respectively.

If the resolution of the image input to the AI model 145 is preset, the plurality of regions are each resized to fit a preset resolution and input to the AI model 145. When an image of various sizes is inputted into the AI model 145, there is a higher probability of identifying objects of various sizes.

When comparing with an example in which the entire image 312 itself is resized according to the preset resolution and input to the AI model 145, the probability of identifying an object of a relatively small size may be higher when the plurality of regions are resized and input.

The AI model 145 may be a model trained to output information on the object identified by the AI model 145 and reliability of information on the identified object.

The processor 150 may identify an object included in the identified image based on information on the identified object in each of the plurality of regions and reliability of information on the objet identified in each of the plurality of regions, output by the AI model. The reliability may denote a probability that the (identified) object is in the input region.

The processor 150 may identify a region, among a plurality of regions extracted by the multi-scale patches, of which reliability of information on the object output from the AI model 145 is greater than or equal to a threshold value. Using the information on the object output by the AI model 145 for the identified region, the processor 150 may identify an object in the identified image.

When there are a plurality of regions of which output reliability of information on the object is greater than or equal to a threshold value, the processor 150 may use a location in the image of each of the corresponding regions.

For example, when different objects are identified for each of a plurality of regions that are spaced apart from each other in an image, the processor 150 may identify that a plurality of objects are identified in an image. As another example, when different objects are identified for each of the plurality of regions of which a significant part overlaps each other in an image, the processor 150 may identify an object based on information of an object of which reliability is relatively higher.

Figure 5C:
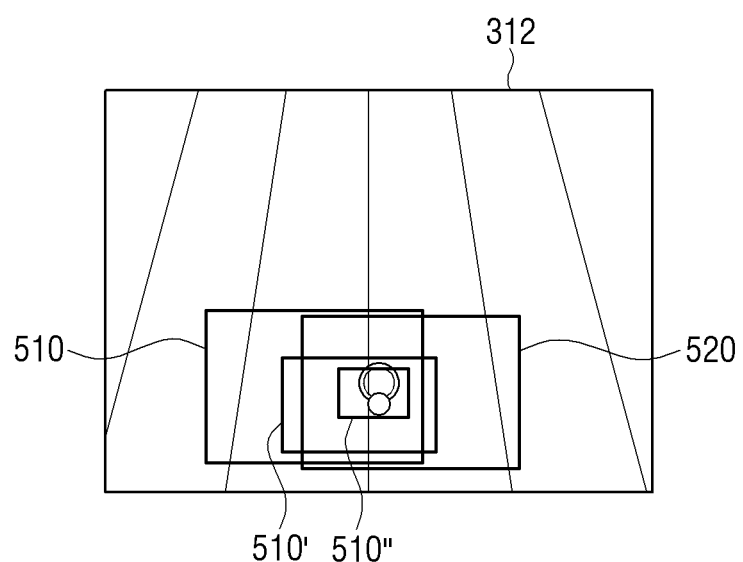
FIG. 5C and FIG. 5D are diagrams illustrating an example of identifying an object in an image using an output as a result of inputting each of a plurality of regions to an artificial intelligence model.
Figure 5D:
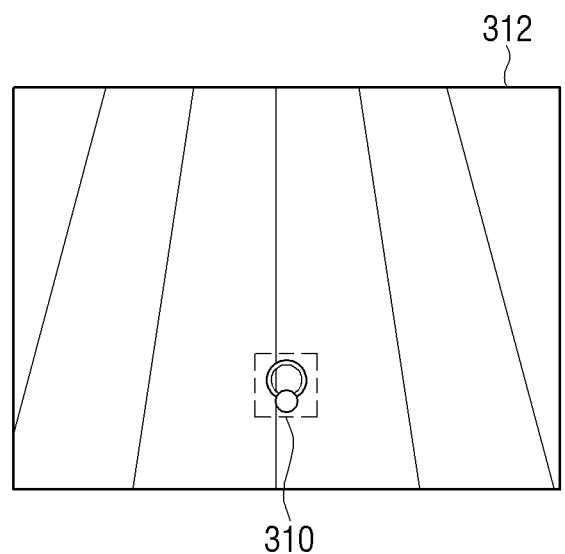

FIG. 5C and FIG. 5D are diagrams illustrating an example of identifying an object in an image using an output as a result of inputting each of a plurality of regions to an artificial intelligence model.

Referring to FIG. 5C, reliability of information on the object output by the AI model 145 exceeds a threshold value for some regions 510, 520, 510', 510" among a plurality of regions extracted by the multi-scale patch in the image 312.

Referring to FIG. 5C, the information on the object output by the AI model 145 for each of the corresponding regions 510, 520, 510', 510", respectively, may correspond to "earring."

As a result, as illustrated in FIG. 5D, the processor 150 may identify the earring 310 from the image 312.

When an object (e.g., earring) is identified from the image identified within a preset time prior to the shock detection time as illustrated in FIG. 5D, the processor 150 may train the AI model 145 using information on the identified object and the identified image.

As a result, when the image including the corresponding object (e.g., earring) is input again to the AI model 145 through the real-time inference module 221, there is a higher possibility that the object is immediately identified by the real-time inference module 221.

If the object identified through the multi-scale inference module 222 is a preset object such as an earring, a ring, a necklace, a coin, or the like, the processor 150 may provide information (e.g., name, type, size, color, or the like, of an object) on the identified object. As a result, the user may be provided with information on a mistakenly ingested object.

The processor 150 may provide information on the identified object through a display, an audio outputter, or the like, provided in the robot cleaner 100 visually and audibly. In this example, the processor 150 may visually provide information on the identified object and also an image in which the corresponding object is identified (an image obtained within a preset time prior to the time when shock is detected).

The processor 150 may transmit information on the identified object to a portable terminal device implemented as a smartphone, or the like, of a user through a communicator of the robot cleaner 100.

The processor 150 may identify a zone or location in which the robot cleaner 100 is positioned at the time when shock is detected and may provide information on the identified zone or location along with the information on the identified object.

For this purpose, the robot cleaner 100 may further include a location detection sensor, and the memory 140 may store information on a map required for traveling of the robot cleaner. The map may denote data indicating a physical geography of a place where the robot cleaner 100 travels, and may be, but is not limited thereto, stored as an image, coordinate data, or other positional data in the memory 140.

The information on a map may include information on a map itself, that is, geographical or two-dimensional information of a space in which the robot cleaner 100 travels, and may further include zone information on each of a plurality of zones included in the map.

The geographical information may include information on a structure (shape/size) of the space, information on a structure (shape/size) of each of the plurality of regions included in the space, information on a location in a space of each of the plurality of regions, or the like.

The zone information may denote information for identifying each of the plurality of zones. The zone information may be composed of an identification name, an identification number, or the like, indicating each of the plurality of zones. The zone information may include information on a usage of each of the plurality of zones, for example, a plurality of zones may be defined as a living room, a bathroom, or a bed room by zone information.

The processor 150 may identify a zone in which the robot cleaner is located at the time when shock is detected among a plurality of zones included in the map, based on the sensing data received through the location detection sensor.

Figure 6A:
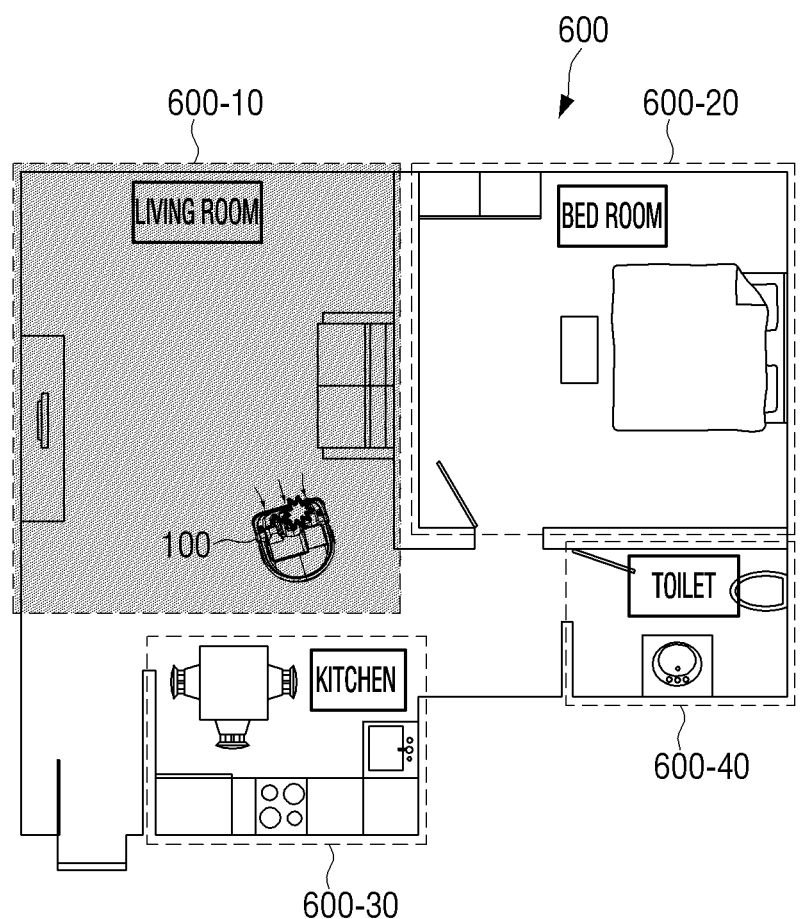
FIG. 6A is a diagram illustrating an example of identifying a zone in which a robot cleaner mistakenly ingests an object.

FIG. 6A is a diagram illustrating an example of identifying a zone in which a robot cleaner mistakenly ingests an object. Referring to FIG. 6A, information on a map 600 corresponding to a house is stored in the memory 140.

The processor 150 may identify a zone in which the robot cleaner 100 is located using sensing data of the location detection sensor and the information on a map 600 stored in the memory 140.

As a specific example, when the location detection sensor is a LiDAR sensor, the processor 150 may identify that the zone in which the robot cleaner 100 is located is a living room 600-10 by comparing sensing data received from the location detection sensor and the information on the map 600 stored in the memory 140.

In this example, the processor 150 may identify the zone 600-10 in which the robot cleaner 100 is located among the plurality of zones on the map, by comparing information on the structure (shape/size) around the robot cleaner 100 included in the sensing data with information on a structure (shape/size) of each of a plurality of zones 600-10, 600-20, 600-30, 600-40 on the map 600 included in the information on the map.

If shock is detected by the shock detection sensor 120, the processor 150 may identify that the zone in which the robot cleaner 100 is located at the time of detecting the shock is the living room corresponding to zone 600-10.

Figure 6B:
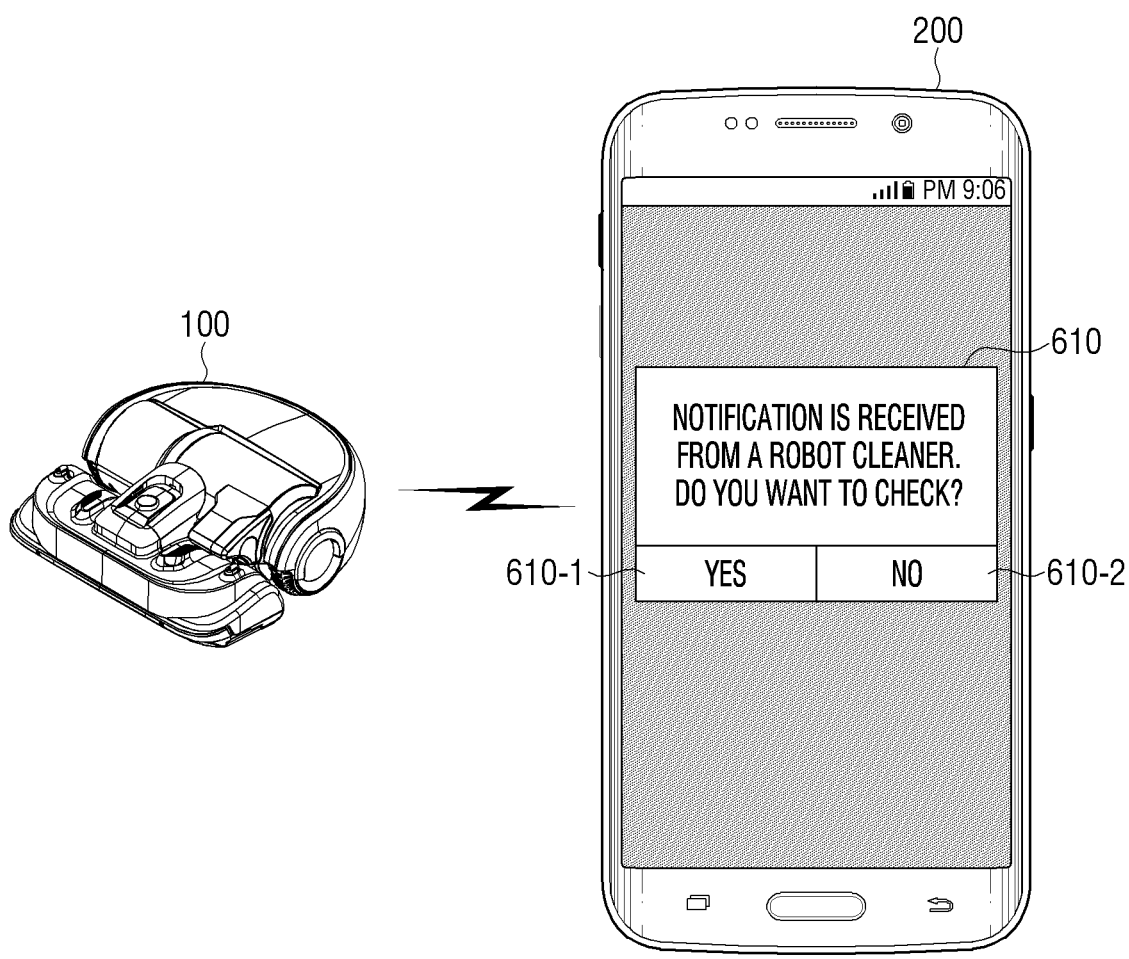
FIGS. 6B and 6C are diagrams illustrating an example of a robot cleaner providing, to a portable terminal device, information on a zone in which shock is detected and information on an object mistakenly ingested.
Figure 6C:
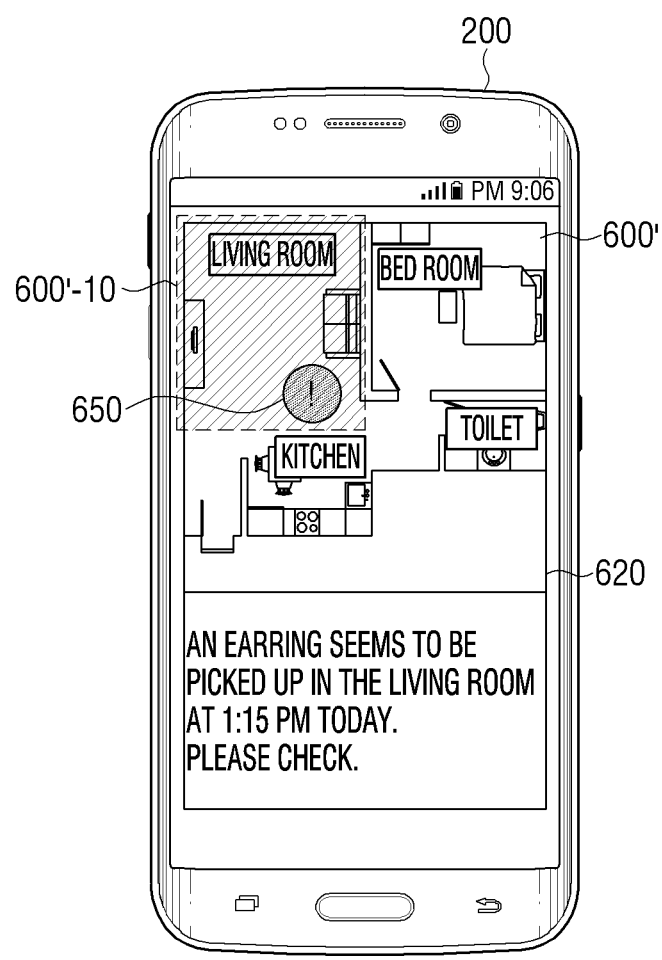

FIGS. 6B and 6C are diagrams illustrating an example of a robot cleaner providing, to a portable terminal device, information on a zone in which shock is detected and information on an object mistakenly ingested.

Referring to FIG. 6B, based on receiving information on a zone where shock is sensed and information on a mistakenly ingested object from the robot cleaner 100, a portable terminal device 200 which is implemented with a smartphone may display a notification 610 indicating that the information is received from the robot cleaner 100.

In this example, the user may select YES 610-1 or NO 610-2 through a touch, or the like. Based on receiving a touch input, or the like, for selecting the YES 610-1 at the portable terminal device 200, the portable terminal device 200 may provide received information as illustrated in FIG. 6C.

Referring to FIG. 6C, the portable terminal device 200 may display a user interface (UI) 620 including a map image 600' and information on a mistakenly ingested object.

Referring to FIG. 6C, the UI 620 may display a text including "1:15 pm today," "living room," "earring," and inform the user that "earring" is mistakenly ingested.

Referring to FIG. 6C, "living room" 600-10 in which "earring" is ingested may be displayed to be darker than other zones on the map image 600' included in the UI 620, and a specific region 650 indicating a specific location in the living room where shock is detected (the earring is ingested) may be separately marked and displayed.

If the object which is a cause of the shock is not identified event through the multi-scale inference module 222, the processor 150 may transmit, to an external server or the like, an image identified within a preset time prior to shock detection point in time. The external server may identify an object included in an image based on an image and transmit information on the identified object to the robot cleaner 100. The processor 150 may update or train the AI model 145 based on the received information on the object.

The processor 150 may provide a user with an identified image and may receive information about what is an object (ingested object) included in the image from a user. In this example, the AI model 145 may be updated or trained based on the identified image and information on the object input from the user.

The embodiment of the robot cleaner 100 described above may be implemented with a system including the robot cleaner 100 and a server device, not only with the robot cleaner 100 alone.

Among the modules of FIG. 2B, the multi-scale inference module 222 may be included in the server device. For this purpose, the server device may store a separate AI model to identify the object.

Figure 7:
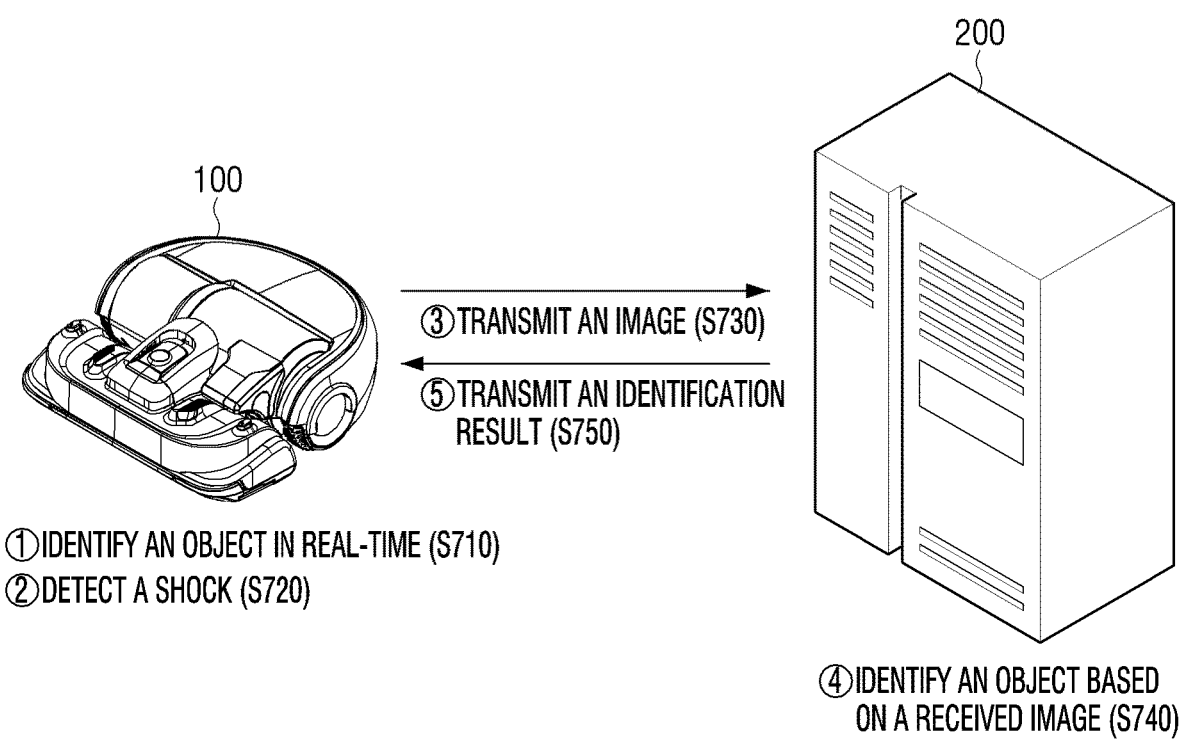
FIG. 7 is a diagram illustrating an example of identifying an object mistakenly ingested by a system including a robot cleaner and a server device according to an embodiment.

FIG. 7 is a diagram illustrating an example of identifying an object mistakenly ingested by a system including a robot cleaner and a server device according to an embodiment.

Referring to FIG. 7, the robot cleaner 100 may identify a nearby object using the real-time inference module 221 in operation S710. The robot cleaner 100 may perform object identification for a plurality of images obtained through the camera 130. The robot cleaner 100 may control traveling and the pickup operation according to the object identification result.

If a shock is detected by the shock detection sensor 120 in operation S720, the robot cleaner 100 may identify an image within a preset time prior to the time when shock is detected among the plurality of images described above and may transmit the identified image to the server device 200 in operation S730.

The server device 200 may identify an object included in the received image using the multi-scale inference module in operation S740. The server device 200 may obtain a plurality of regions corresponding to each patch in the receiving image using a plurality of patches in different sizes and may identify an object included in the received image by inputting the plurality of obtained regions to the AI model in the server device 200.

The server device 200 may transmit information on the identified object to the robot cleaner 100 in operation S750.

In this example, when the identified object is a preset object, the robot cleaner 100 may provide information on the identified object.

In this example, object identification through the multi-scale inference module with relatively larger amount of computation is performed by a separate server device 200 and thus the object mistakenly ingested may be identified without high computation of the robot cleaner 100.

Figure 8:
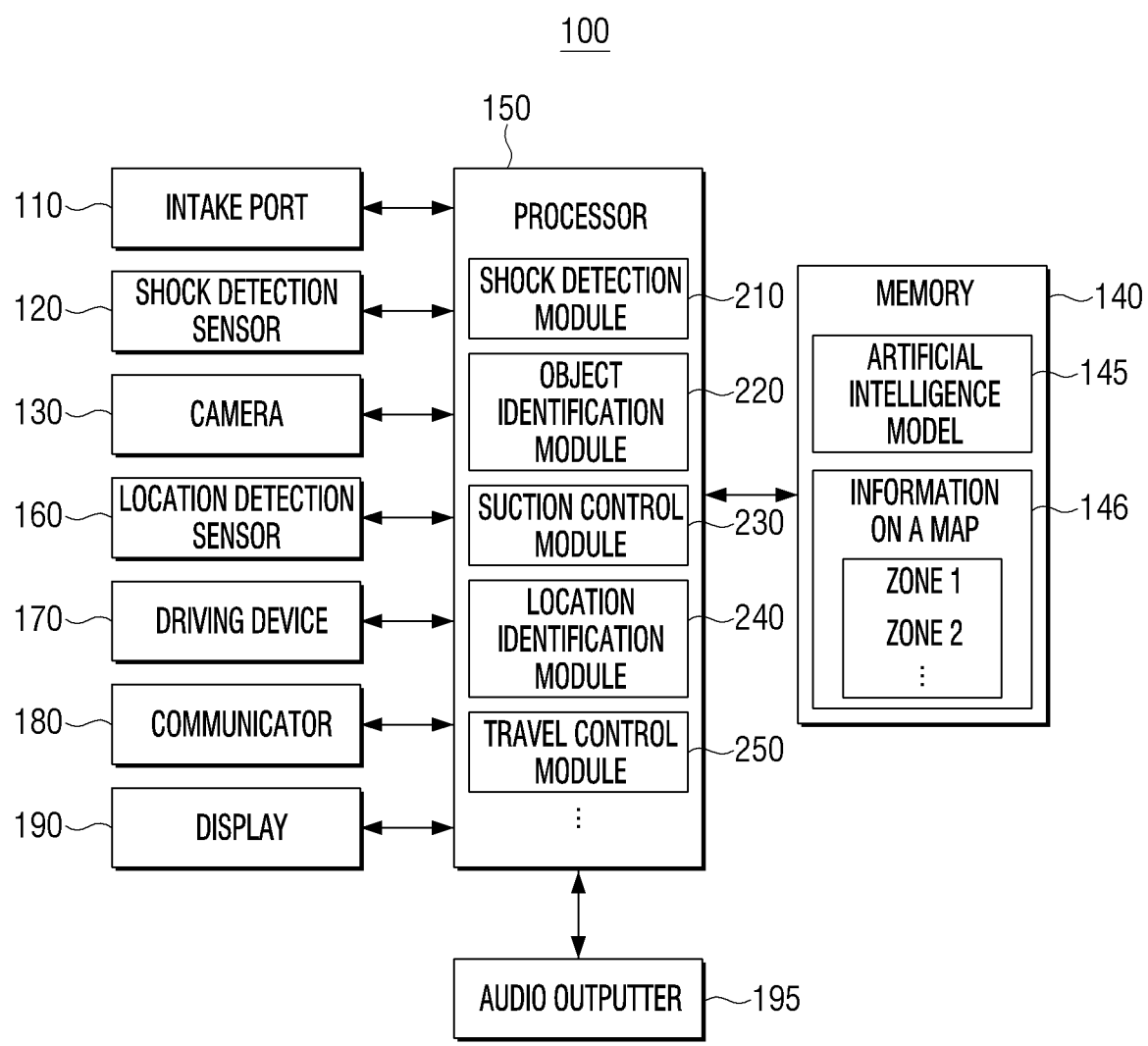
FIG. 8 is a block diagram illustrating a specific configuration of a robot cleaner according to various embodiments.

FIG. 8 is a block diagram illustrating a specific configuration of a robot cleaner according to various embodiments.

Referring to FIG. 8, in addition to those components illustrated in FIGS. 2A-B, the robot cleaner 100 may further include at least one of a location detection sensor 160, a driving device 170, a communicator 180, a display 190, and an audio outputter 195. Certain redundant descriptions of the intake port 110, the shock detection sensor 120, the camera 130, the memory 140, and the processor 150 are omitted.

As described above, the camera 130 may be implemented with an RGB camera, a 3D camera, or the like. The 3D camera may be implemented with a time of flight (TOF) camera including a TOF sensor and an infrared light. The 3D camera may include an infrared (IR) stereo sensor. The camera 130 may include, but is not limited to, a sensor such as a charge-coupled device (CCD) or a complementary metal-oxide semiconductor (CMOS). When the camera 130 includes a CCD, the CCD may be implemented with a red/green/blue (RGB) CCD, an IR CCD, or the like.

The memory 140 may store one or more AI model (e.g., 145). One or more AI model may be stored in a storage such as a hard disk, SSD, or the like.

A function of the stored AI model may be performed through the processor 150 and the memory 140.

The processor 150 may be configured with one or a plurality of processors. At this time, one or a plurality of processors may be a general purpose processor, such as a central processing unit (CPU), an application processor (AP), or the like, a graphics-only processor such as graphics processing unit (GPU), visual processing unit (VPU), or the like, or an AI-dedicated processor such as neural network processing unit (NPU).

The one or more processors 150 control the processing of the input data according to a predefined operating rule or AI model stored in the memory 140. The predefined operating rule or AI model is made through learning.

Here, that the AI model is made through learning may refer that the learning algorithm is applied to a plurality of learning data, so that a predefined operating rule or AI model of a desired characteristic is generated. The learning of the AI model may be performed in a device itself in which AI according to the disclosure is performed, and may be implemented through a separate server/system.

The AI model may include a plurality of neural network layers. Each layer has a plurality of weight values, and performs a layer operation through a result of calculation of a previous layer and an operation of a plurality of weights. Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Networks, and the neural network in the disclosure is not limited to the above-described example.

The learning algorithm is a method for training a predetermined target device (e.g., a robot) using a plurality of learning data to cause the predetermined target device to make a determination or prediction by itself. Examples of learning algorithms include supervised learning, unsupervised learning, semi-supervised learning, or reinforcement learning, and the learning algorithm in the disclosure is not limited to the examples described above except when specified.

The memory 140 may also store information 146 on the map including the information on a plurality of zones as described above.

The processor 150 may further include a suction control module 230, a location identification module 240, a travel control module 250, or the like, in addition to the shock detection module 210 and the object identification module 220.

The suction control module 230 is a module for controlling suction state, suction intensity, or the like, of the intake port 110. The suction control module 230 may control of the intake operation of the intake port 110 according to the object identification result of the real-time inference module 221 among the object identification modules 220. As described above, suction may include any mechanical or vacuum system for retrieving objects on the floor.

The location identification module 240 may identify a zone where the robot cleaner 100 is located. As described with reference to FIG. 6A, the location identification module 240 may compare the sensing data received through the location detection sensor 160 with the information 146 on the map stored in the memory 140 to identify a zone where the robot cleaner 100 is located.

The location detection sensor 160 may be implemented with the LiDAR sensor, the ultrasonic sensor, or the like. The 3D camera which may be included in the camera 130 may be included in the location detection sensor 160.

The driving device 170 is a system for moving of the robot cleaner 100. The driving device 170 may include a moving means implemented as one or more wheels, an actuator or motor for propelling the moving means, connecting structures therebetween, and the like.

The processor 150 may control the driving device 170 through the travel control module 250. The travel control module 250 may identify a moving speed, a moving direction, a location, or the like, of the robot cleaner 100 and may control the driving device 170 based thereon.

The robot cleaner 100 may include an acceleration sensor, a geomagnetic sensor, or the like, and may identify a moving speed, a moving direction, location or the like of the robot cleaner 100 through the sensing data of the corresponding sensors.

The travel control module 250 may control the driving device 170 according to the object identification result of the real-time inference module 221.

The communicator 180 is configured to perform communication by the robot cleaner 100 with at least one external device to transmit data to other devices and receive data from other devices. For this purpose, the communicator 180 may include communication circuitry such as an antenna or wired communication circuitry.

The communicator 180 may include a wireless communication module, a wired communication module, or the like.

The wireless communication module may include at least one of a Wi-Fi communication module, a Direct Wi-Fi communication module, a Bluetooth module, an Infrared Data Association (IrDA) module, a third generation (3G) mobile communication module, a fourth generation (4G) mobile communication module, a fourth generation Long Term Evolution (LTE) communication module, for receiving content from an external server or an external device.

The wired communication module may be implemented as a wired port such as a Thunderbolt port, a universal serial bus (USB) port, or the like.

The processor 150 may transmit, to an external device such as a portable terminal device or a server device, or the like, the object identification result through the object identification module 220 through the communicator 180.

Through the display 190, the processor 150 may visually provide information about the mistakenly ingested object. Also, through the display 190, the processor 150 may visually provide information about the zone in which the robot cleaner 100 is located at the time the shock is detected.

For this purpose, the display 190 may be implemented as a liquid crystal display (LCD), plasma display panel (PDP), organic light emitting diodes (OLED), transparent OLED (TOLED), micro LED, or the like.

The display 190 may be implemented as a touch screen capable of detecting a touch operation of a user and may be implemented as a flexible display that is foldable or bendable.

Through the audio outputter 195, the processor 150 may audibly provide information about the information on a zone where the robot leaner 100 is located at the time when information and/or shock about the mistakenly ingested object is detected.

The audio outputter 195 may be implemented as a speaker and/or a headphone/earphone output terminal.

A method for controlling the robot cleaner according to an embodiment will be described with reference to FIGS. 9 to 11.

Figure 9:
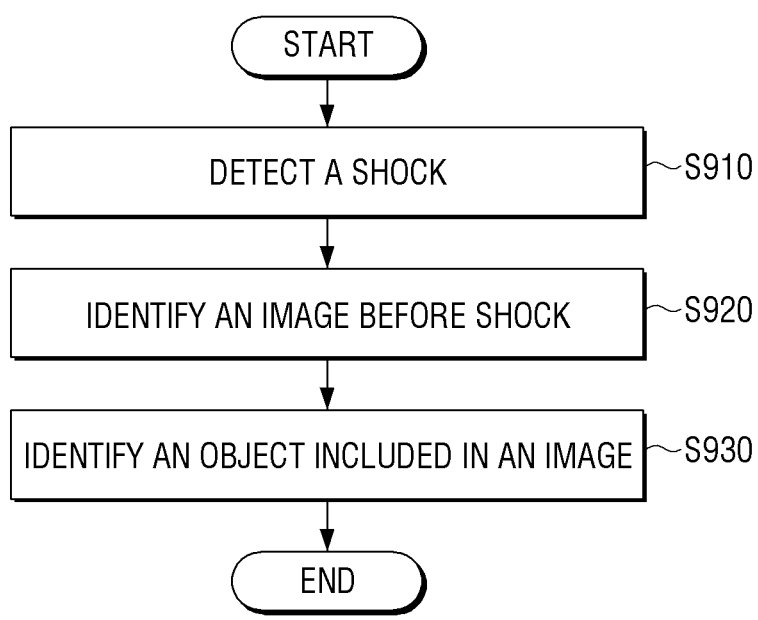
FIG. 9 is a flowchart illustrating a method of controlling a robot cleaner according to an embodiment.

FIG. 9 is a flowchart illustrating a method of controlling a robot cleaner including a memory storing an artificial intelligence model trained to identify an object according to an embodiment.

Referring to FIG. 9, the robot cleaner may detect a shock through a shock detection sensor in operation S910. Here, the shock generated by the object ingested by the intake port may be detected. In this example, the image which is identified within a preset time before the time when a shock is detected among the plurality of images obtained through the camera may be identified in operation S920.

Specifically, the controlling method may include identifying an object by inputting a plurality of images obtained through a camera into an artificial intelligence model based on the robot cleaner being in a cleaning mode, and controlling traveling and suction based on the identified object to perform cleaning.

Based on the shock of the object ingested by the intake port being detected, the image obtained within a preset time before the time when the shock is detected, among the plurality of images, may be identified. The identified image may be stored in a memory.

The controlling method may include identifying an object included in the identified image in operation S930.

In this example, a plurality of regions corresponding to each patch may be obtained from the identified image using a plurality of patches of different sizes. The object included in the identified image may be identified by inputting the plurality of obtained regions into an artificial intelligence model.

In this example, each of a plurality of regions corresponding to each patch may be input to an artificial intelligence model to obtain an output for each of a plurality of regions from the artificial intelligence model, and an object included in the identified image may be identified based on the location of each of the plurality of regions in the identified image and the output obtained from the artificial intelligence model.

The artificial intelligence model may output information about the object identified by the artificial intelligence model and the reliability of the information for the identified object. In this example, the controlling method may include identifying an object included in the identified image based on information on the object identified in each of the plurality of regions and information on the object identified in each of the plurality of regions output by the artificial intelligence model.

The controlling method may perform the operation of S930 when the robot cleaner is in a resting mode in which the robot cleaner may be docked to a charging station. When an image identified on a cleaning mode is stored in a memory, a plurality of regions obtained in the stored image may be input to an artificial intelligence model to identify an object included in the stored image.

The controlling method may train an artificial intelligence model based on information on the identified object and the identified image.

The controlling method may provide information on the identified object when the identified object is a preset object.

If information on a map required for traveling of the robot cleaner is stored in the memory, the zone where the robot cleaner is located may be identified at the time when the shock is detected among the plurality of zones included in the map, and if the identified object is a preset object, information on the identified object and information about the identified zone may be provided.

The information on the identified object and the information on the identified zone may be transmitted to the portable terminal device of the user through the communicator.

Figure 10:
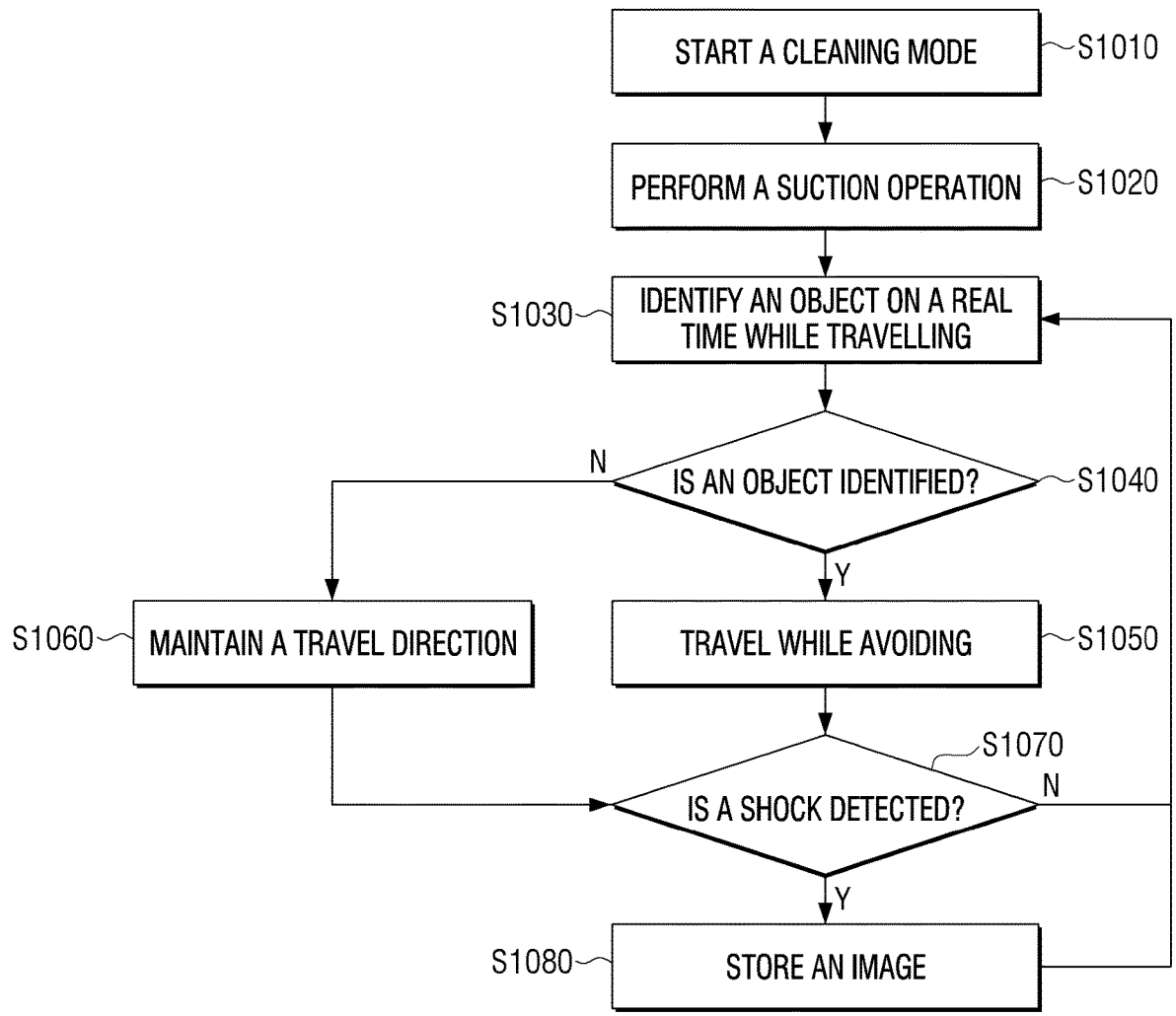
FIG. 10 is a flowchart illustrating a method of controlling a robot cleaner in a cleaning mode.

FIG. 10 is a flowchart illustrating a method of controlling a robot cleaner in a cleaning mode.

Referring to FIG. 10, if a cleaning mode begins in operation S1010, the robot cleaner may perform suction in operation S1020. The robot cleaner may identify an object on a real time while travelling in operation S1030.

The traveling and suction may be controlled differently according to an object identification result.

If the object is identified in operation S1040-Y, the robot cleaner may travel while avoiding the object in operation S1050. When an object (e.g., a flowerpot, a book, a sofa, etc.) which the robot cleaner may not pass, an object (e.g., vinyl, clothes, etc.) which the robot cleaner should not pass or climb, an object (e.g., ring, earring, etc.) which the robot cleaner should not ingest, or the like, are identified, the robot cleaner may travel while avoiding the object in operation S1050.

If the object is not identified in operation S1040-N, a travel direction may be maintained in operation S1060.

Although not shown in FIG. 10, even if the object is identified, if the identified object is an object (e.g., a carpet, etc.) which the robot cleaner can pass or climb, or an object (e.g., foreign substance) which the robot cleaner should clean, the robot cleaner may maintain the travel direction.

If a shock is detected during the operation of the cleaning mode in operation S1070-Y, the image obtained within a preset time before the time when the shock is detected among the plurality of images used in the object identification step of S1030 may be stored in the memory in operation S1080.

If the shock is not detected in operation S1070-N, traveling, suction, and real-time object identification may be repeated in operation S1030.

Figure 11:
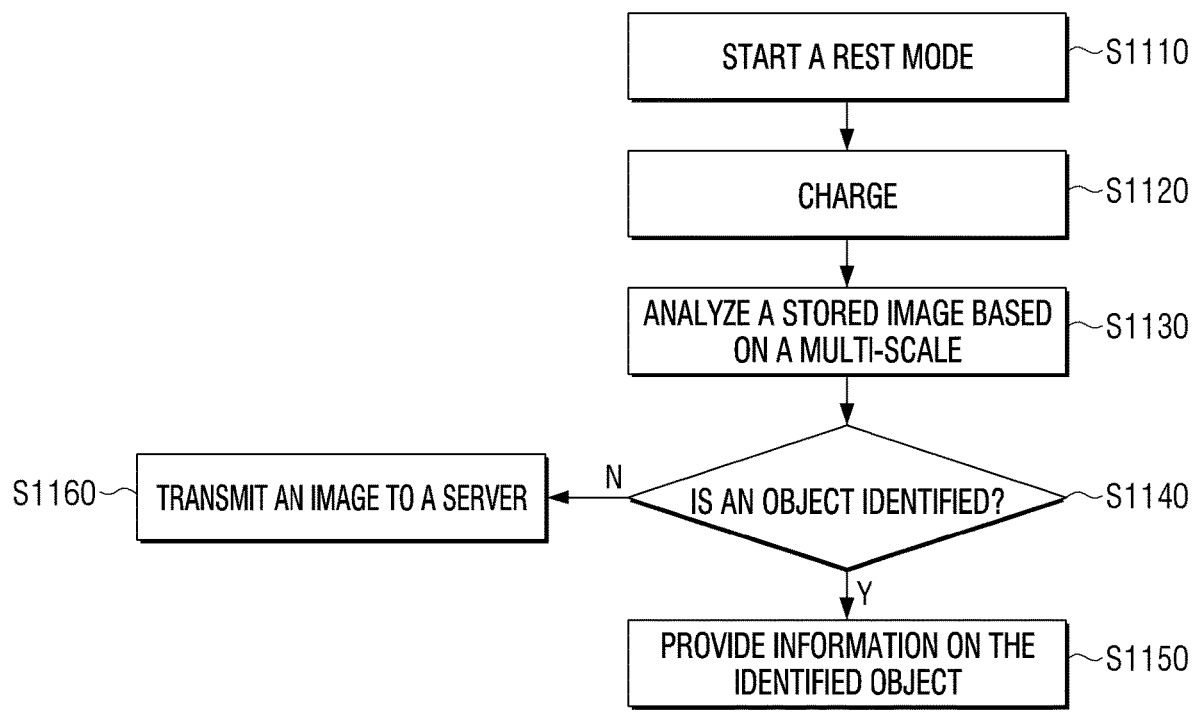
FIG. 11 is a flowchart illustrating a method of controlling a robot cleaner in a rest mode.

FIG. 11 is a flowchart illustrating a method of controlling a robot cleaner in a rest mode.

Referring to FIG. 11, when the rest mode begins in operation S1110, the robot cleaner may perform charging when connected to a docking station in operation S1120. The image stored in operation S1080 may be analyzed based on a multi-scale patch to identify the object in operation S1130.

If the object is identified in operation S1140-Y, information on the identified object may be provided in operation S1150. If the identified object is a preset object, such as a jewelry, information on the identified object may be provided.

If the object is not identified in operation S1140-N, the stored image may be transmitted to the server device in operation S1160. In general, as a server device may operate a larger capacity AI model as compared to a robot cleaner, and may have a larger amount of computation, a corresponding image may be transmitted to a server device when an object is not identified by a multi-scale patch-based analysis.

If an object in the image is identified through the server device, information on the identified object may be received at the robot cleaner, and the robot cleaner may provide the corresponding information.

The controlling method described through FIGS. 9 to 11 may be implemented through the robot cleaner 100 illustrated and described with reference to FIGS. 2A-B and 8.

The controlling methods of FIGS. 9 to 11 may be implemented through a system including the robot cleaner 100 and one or more external devices.

The robot cleaner according to an embodiment may, when a small object which has not yet been identified is ingested by the robot cleaner, identify the object through an in-depth analysis on the image and provide an identification result.

As a result, the robot cleaner according to an embodiment may have an effect to reduce risk of losing a jewelry of a user due to a malfunction of a robot cleaner and enable a user may rapidly recognize a failure or a cause of the failure of the robot cleaner. Alternatively, damage to the robot cleaner due to hazardous objects or clogging of the robot cleaner may be prevented or more easily diagnosed by the user.

The various example embodiments described above may be implemented in a recordable medium which is readable by computer or a device similar to computer using software, hardware, or the combination of software and hardware.

By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions, or the like.

In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations of the robot cleaner 100 according to the various embodiments described above may be stored in a non-transitory computer-readable medium. The computer instructions stored in this non-transitory computer-readable medium may cause the above-described specific device to perform the processing operations in the robot cleaner 100 according to the above-described various example embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely examples and are not to be understood as limiting the disclosure. The disclosure may be readily applied to other types of devices. The description of the embodiments of the disclosure is intended to be illustrative, and not to limit the scope of the claims, and many alternatives, modifications, and variations will be apparent to those skilled in the art.

What is claimed is:

1. A robot cleaner comprising:
an intake port;
a shock detection sensor;
a camera;
a memory storing computer-readable instructions; and
a processor configured to execute the computer-readable instructions to control the robot cleaner to:
based on the robot cleaner being in a cleaning mode and an impact of an object ingested by the intake port being detected through the shock detection sensor, identify an image of the object captured within a preset time before the impact is detected from among a plurality of images captured by the camera,
based on the robot cleaner being in a rest mode, obtain a plurality of regions corresponding to each patch from the image using a plurality of patches of different sizes,
obtain an output for each region of the plurality of regions from an artificial intelligence model by inputting each region of the plurality of regions to the artificial intelligence model,
based on a location of the each region of the plurality of regions and the output obtained from the artificial intelligence model, determine an identity of the object; and
output information indicating that the object has been ingested by the robot cleaner, based on the identity of the object.

2. The robot cleaner of claim 1, wherein:
the artificial intelligence model is configured to output information on the object identified by the artificial intelligence model and reliability of the information on the object, and
the processor executing the computer-readable instructions is configured to identify the object included in the image based on the information on the object identified from each region of the plurality of regions and the reliability of the information on the object from each region of the plurality of regions.

3. The robot cleaner of claim 2, further comprising:
a driving device,
wherein the processor executing the computer-readable instructions is configured to:
based on the robot cleaner being in the cleaning mode, control the driving device to control traveling of the robot cleaner in a surrounding environment.

4. The robot cleaner of claim 3, wherein the processor is configured to train the artificial intelligence model based on the information on the object and the image.

5. The robot cleaner of claim 1, wherein the processor executing the computer-readable instructions is configured to, based on the object being a preset object, output the information indicating that the object has been ingested by the robot cleaner.

6. The robot cleaner of claim 5, further comprising:
a location detection sensor configured to detect sensing data,
wherein:
the memory stores information on a map of a surrounding environment, and
the processor executing the computer-readable instructions is configured to:
based on the sensing data, identify a zone in the surrounding environment where the robot cleaner is located at a point in time when the impact is detected, based on the map, and
output the information indicating that the object has been ingested by the robot cleaner in the zone.

7. The robot cleaner of claim 6, further comprising:
a communicator,
wherein the processor executing the computer-readable instructions is configured to transmit, to a portable terminal device of a user, the information indicating that the object has been ingested by the robot cleaner in the zone through the communicator.

8. A method of controlling a robot cleaner, the method comprising:
based on the robot cleaner being in a cleaning mode and an impact of an object ingested by an intake port being detected through a shock detection sensor, identifying an image of the object captured within a preset time before the impact is detected from among a plurality of images captured by a camera;
based on the robot cleaner being in a rest mode, obtaining a plurality of regions corresponding to each patch from the image using a plurality of patches of different sizes;

obtaining an output for each region of the plurality of regions from an artificial intelligence model by inputting each region of the plurality of regions to the artificial intelligence model,
based on a location of the each region of the plurality of regions and the output obtained from the artificial intelligence model, determining an identity of the object; and
outputting information indicating that the object has been ingested by the robot cleaner, based on the identity of the object.

9. The method of claim 8, wherein:
the artificial intelligence model is configured to output information on the object identified by the artificial intelligence model and reliability of the information on the object, and
the determining comprises identifying the object included in the image based on the reliability of the information on the object identified from each region of the plurality of regions and the information on the object from each region of the plurality of regions, output by the artificial intelligence model.

10. The method of claim 9, further comprising:
based on the robot cleaner being in the cleaning mode, controlling travelling of the robot cleaner in a surrounding environment.

11. The method of claim 10, further comprising:
training the artificial intelligence model based on the information the object and the image.

12. The method of claim 8, wherein the outputting comprises:
based on the object being a preset object, outputting the information indicating that the object has been ingested by the robot cleaner.

13. The method of claim 12, further comprising:
storing a map of a surrounding environment in the robot cleaner,
wherein the method further comprises:
identifying a zone in the surrounding environment where the robot cleaner is located at a point in time when the impact is detected, based on the map, and
wherein the outputting comprises outputting the information indicating that the object has been ingested by the robot cleaner in the zone.

14. The method of claim 13, wherein the outputting comprises transmitting, to a portable terminal device of a user, the information indicating that the object has been ingested by the robot cleaner in the zone.

15. A system comprising:
a robot cleaner configured to identify at least one object by providing a plurality of images obtained through a camera as input to a first artificial intelligence model, and to perform traveling and cleaning of a surrounding environment on which the robot cleaner operates based on the identified at least one object; and
a server device configured to store a second artificial intelligence model,
wherein the robot cleaner is configured to, based on an impact on the robot cleaner of an object ingested by the robot cleaner being detected, transmit, to the server device, an image captured within a preset time before a time when the impact is detected from among the plurality of images, and
wherein the server device is configured to:
obtain a plurality of regions corresponding to each patch from the image using a plurality of patches of different sizes, obtain an output for each region of the plurality of regions from the second artificial intelligence model by inputting each region of the plurality of regions to the second artificial intelligence model, based on a location of the each region of the plurality of regions and the output obtained from the second artificial intelligence model, determine an identity of the object, and transmit information on the identity of the object to the robot cleaner.

* * * * *